US008841363B2

(12) United States Patent
Yamamoto et al.

(10) Patent No.: US 8,841,363 B2
(45) Date of Patent: Sep. 23, 2014

(54) COPOLYMERS HAVING LONG-CHAIN ACRYLATES

(75) Inventors: Motonori Yamamoto, Mannheim (DE); Ulrike Licht, Mannheim (DE); Dietrich Scherzer, Neustadt (DE)

(73) Assignee: BASF SE, Ludwigshafen (DE)

( * ) Notice: Subject to any disclaimer, the term of this patent is extended or adjusted under 35 U.S.C. 154(b) by 207 days.

(21) Appl. No.: 13/123,990

(22) PCT Filed: Oct. 2, 2009

(86) PCT No.: PCT/EP2009/062810
§ 371 (c)(1),
(2), (4) Date: Apr. 13, 2011

(87) PCT Pub. No.: WO2010/043505
PCT Pub. Date: Apr. 22, 2010

(65) Prior Publication Data
US 2011/0201728 A1    Aug. 18, 2011

(30) Foreign Application Priority Data
Oct. 14, 2008  (EP) ..................... 08166596

(51) Int. Cl.
C08F 220/18    (2006.01)
C08F 220/32    (2006.01)
C08L 3/02      (2006.01)

(52) U.S. Cl.
CPC .............. C08F 220/18 (2013.01); C08L 3/02 (2013.01); C08F 220/32 (2013.01)
USPC ............... 524/53; 526/273; 525/55; 525/123

(58) Field of Classification Search
USPC .................. 525/123, 55; 524/53; 526/273
See application file for complete search history.

(56) References Cited

U.S. PATENT DOCUMENTS

| | | |
|---|---|---|
| 5,128,386 A | 7/1992 | Rehmer et al. |
| 5,223,645 A | 6/1993 | Barwich et al. |
| 5,772,851 A | 6/1998 | Barwich et al. |
| 5,817,721 A | 10/1998 | Warzelhan et al. |
| 5,863,991 A | 1/1999 | Warzelhan et al. |
| 5,880,220 A | 3/1999 | Warzelhan et al. |
| 5,889,135 A | 3/1999 | Warzelhan et al. |
| 5,936,045 A | 8/1999 | Warzelhan et al. |
| 6,018,004 A | 1/2000 | Warzelhan et al. |
| 6,046,248 A | 4/2000 | Warzelhan et al. |
| 6,111,058 A | 8/2000 | Warzelhan et al. |
| 6,114,042 A | 9/2000 | Warzelhan et al. |
| 6,120,895 A | 9/2000 | Kowitz et al. |
| 6,201,034 B1 | 3/2001 | Warzelhan et al. |
| 6,258,924 B1 | 7/2001 | Warzelhan et al. |
| 6,303,677 B1 | 10/2001 | Warzelhan et al. |
| 6,353,084 B1 | 3/2002 | Warzelhan et al. |
| 6,946,051 B2 | 9/2005 | Fink et al. |
| 6,984,694 B2 * | 1/2006 | Blasius et al. ................ 525/148 |
| 7,709,052 B2 | 5/2010 | Dyllick-Brenzinger et al. |
| 2006/0027316 A1 | 2/2006 | Jung et al. |
| 2007/0082981 A1 * | 4/2007 | Noda et al. ...................... 524/47 |
| 2007/0197111 A1 | 8/2007 | Dieleman et al. |
| 2008/0161449 A1 * | 7/2008 | Yamamoto et al. ............. 524/35 |
| 2009/0324945 A1 | 12/2009 | Licht et al. |
| 2011/0014404 A1 | 1/2011 | Beyers et al. |

FOREIGN PATENT DOCUMENTS

| | | |
|---|---|---|
| CA | 2005283 A1 | 6/1990 |
| CA | 1337615 C | 11/1995 |
| DE | 3844444 A1 | 8/1990 |
| DE | 4037079 A1 | 5/1992 |
| EP | 346734 A2 | 12/1989 |
| EP | 377199 A2 | 7/1990 |
| EP | 655465 A1 | 5/1995 |
| EP | 911361 A1 | 4/1999 |

(Continued)

OTHER PUBLICATIONS

Yamada et al., Introduction of Fatty Acids to Starch Granules by Ultra-High-Pressure Treatment, *Stärke* 1998 vol. 50, No. 11-12, pp. 484 to 486.

*Primary Examiner* — Randy Gulakowski
*Assistant Examiner* — Christopher M Rodd
(74) *Attorney, Agent, or Firm* — Drinker Biddle & Reath LLP

(57) ABSTRACT

The present invention relates to copolymers obtainable by free-radical polymerization of
  i) 10% to 90% by weight, based on the total weight of components i to iv, of at least one monomer selected from the group consisting of a $C_8$-$C_{30}$ alkyl (meth)acrylate, $C_8$-$C_{30}$ vinyl ester, $C_8$-$C_{30}$ vinyl ether, $C_8$-$C_{30}$ olefin, and triglyceride of unsaturated $C_8$-$C_{30}$ carboxylic acids;
  ii) 0.5% to 70% by weight, based on the total weight of components i to iv, of a double-bond-containing monomer having at least one epoxide, isocyanate, carbodiimide, silane, β-dicarbonyl, oxazoline, or anhydride group;
  iii) 0% to 75% by weight, based on the total weight of components i to iv, of one or more monomers selected from the group consisting of vinylaromatic, $C_1$-$C_7$-alkyl (meth)acrylate, ethylenically unsaturated acetophenone derivative or benzophenone derivative, $C_1$-$C_7$ vinyl ester, $C_1$-$C_7$ vinyl ether, ethylenically unsaturated nitrile, ethylenically unsaturated amide, vinyl halide, $C_2$-$C_7$ olefin, cyclic lactam, and mixtures of these monomers; and
  iv) 0% to 10% by weight, based on the total weight of components i to iv, of a free-radically polymerizable monomer with carboxylic acid, sulfonic acid or phosphonic acid groups or salts thereof.
The invention further relates to polymer mixtures comprising these copolymers and also to the use of the copolymers as chain extenders, compatibilizers and/or hydrolysis stabilizers, to produce paper and cardboard, for surface finishing in the paper, textile, and leather industries, and in adhesives.

6 Claims, No Drawings

(56) References Cited

FOREIGN PATENT DOCUMENTS

| | | |
|---|---|---|
| EP | 1316597 A2 | 6/2003 |
| EP | 1656423 A1 | 5/2006 |
| EP | 1751345 A1 | 2/2007 |
| EP | PCT/EP2007/061284 | 5/2008 |
| WO | WO-92/09654 A2 | 6/1992 |
| WO | WO-96/15173 A1 | 5/1996 |
| WO | WO-96/15174 A1 | 5/1996 |
| WO | WO-96/15175 A1 | 5/1996 |
| WO | WO-96/15176 A1 | 5/1996 |
| WO | WO-96/21689 A2 | 7/1996 |
| WO | WO-96/21690 A1 | 7/1996 |
| WO | WO-96/21691 A1 | 7/1996 |
| WO | WO-96/21692 A1 | 7/1996 |
| WO | WO-96/25446 A1 | 8/1996 |
| WO | WO-96/25448 A1 | 8/1996 |
| WO | WO-98/04748 A1 | 2/1998 |
| WO | WO-98/12242 A1 | 3/1998 |
| WO | WO-2004/037867 A1 | 5/2004 |
| WO | WO-2004/058834 A1 | 7/2004 |
| WO | WO-2005/017034 A1 | 2/2005 |
| WO | WO 2005017034 A1 * | 2/2005 ............... C08K 5/10 |
| WO | WO-2006/097353 A1 | 9/2006 |
| WO | WO-2006/097354 A1 | 9/2006 |
| WO | WO-2008/073703 A2 | 6/2008 |

* cited by examiner

US 8,841,363 B2

COPOLYMERS HAVING LONG-CHAIN ACRYLATES

CROSS-REFERENCE TO RELATED APPLICATIONS

This application is a national stage application (under 35 U.S.C. §371) of PCT/EP2009/062810, filed Oct. 2, 2009, which claims benefit of European application 08166596.0, filed Oct. 14, 2008, the contents of each of which are incorporated herein by reference in their entireties.

FIELD OF THE INVENTION

The present invention relates to copolymers obtainable by free-radical polymerization of
i) 10% to 90% by weight, based on the total weight of components i to iv, of at least one monomer selected from the group consisting of a $C_8$-$C_{30}$ alkyl (meth)acrylate, $C_8$-$C_{30}$ vinyl ester, $C_8$-$C_{30}$ vinyl ether, $C_8$-$C_{30}$ olefin, and triglyceride of unsaturated $C_8$-$C_{30}$ carboxylic acids;
ii) 0.5% to 70% by weight, based on the total weight of components i to iv, of a double-bond-containing monomer having at least one epoxide, isocyanate, carbodiimide, silane, -dicarbonyl, oxazoline, or anhydride group;
iii) 0% to 75% by weight, based on the total weight of components i to iv, of one or more monomers selected from the group consisting of vinylaromatic, (meth)acrylate, ethylenically unsaturated acetophenone derivative or benzophenone derivative, $C_1$-$C_7$ vinyl ester, $C_1$-$C_7$ vinyl ether, ethylenically unsaturated nitrile, ethylenically unsaturated amide, vinyl halide, $C_2$-$C_7$ olefin, cyclic lactam, and mixtures of these monomers; and
iv) 0% to 10% by weight, based on the total weight of components i to iv, of a free-radically polymerizable monomer with carboxylic acid, sulfonic acid or phosphonic acid groups or salts thereof.

The invention further relates to polymer mixtures comprising these copolymers and also to the use of the copolymers as chain extenders, compatibilizers and/or hydrolysis stabilizers, to produce paper and cardboard, for surface finishing in the paper, textile, and leather industries, and in adhesives.

BACKGROUND OF THE INVENTION

Copolymers comprising glycidyl methacrylates and short-chain acrylates—such as n-butyl acrylate, for example—are known from EP-A 1 316 597 These copolymers are suitable for example as adhesives.

Moreover it is known from *Stärke* 1998 vol. 50, no. 11-12, pages 484 to 486 that long-chain fatty acids interact with the helix structure of starch and lead to improved compatibility of the starch in a polymer matrix.

U.S. Pat. No. 6,984,694 describes the addition to polycondensates—such as polyesters, for example—of acrylic copolymers as chain extenders, which attach to the polyester by virtue of their high reactive comonomer content—glycidyl methacrylate being an example of such a comonomer. The comonomers, however, do not comprise long-chain acrylates. The addition of such compounds to polymer mixtures comprising polyesters and starch may—as shown in EP 1 656 423—raise the tensile strength of these systems, but the improvement in the properties is still not sufficient for a variety of extrusion applications.

BRIEF SUMMARY OF THE INVENTION

It has been found that the comonomers of the invention comprising i) a long-chain, double-bond-containing monomer and ii) a reactive monomer drastically improve the properties of polymer mixtures, especially of starch mixtures.

In particular the following embodiments of the copolymers A), B), and C) have proven advantageous.
A) Copolymers obtainable by free-radical polymerization of
i) 10% to 90% by weight, based on the total weight of components i to iii, of at least one $C_8$-$C_{30}$ alkyl (meth)acrylate, $C_8$-$C_{30}$ vinyl ester or $C_8$-$C_{30}$ vinyl ether; particular preference is given to a $C_{10}$-$C_{20}$ alkyl (meth)acrylate;
ii) 0.5% to 60% by weight, based on the total weight of components i to iv, of a reactive monomer selected from the group consisting of glycidyl acrylate, glycidyl methacrylate, maleic anhydride (MAAn), allyl glycidyl ether, glycidyl ethacrylate, dimethyl-meta-isopropenyl-benzyl isocyanate, and itaconic anhydride; particular preference is given to a glycidyl methacrylate;
iii) 0% to 75% by weight, based on the total weight of components i to iv, of a vinylaromatic, $C_1$-$C_7$-alkyl (meth)acrylate or mixtures of these monomers; particular preference is given to styrene or n-butyl acrylate;
iv) 0% to 10% by weight of a free-radically polymerizable monomer with carboxylic acid, sulfonic acid or phosphonic acid groups or salts thereof.
B) Copolymers obtainable by free-radical polymerization of
i) 30% to 90% by weight, based on the total weight of components i to iii, of at least one $C_8$-$C_{30}$ alkyl (meth) acrylate, $C_8$-$C_{30}$ vinyl ester or $C_8$-$C_{30}$ vinyl ether, particular preference is given to a $C_{10}$-$C_{20}$ alkyl (meth) acrylate;
0.5% to 30% by weight, based on the total weight of components i to iii, of a reactive monomer selected from the group consisting of glycidyl acrylate, glycidyl methacrylate, and MAAn; particular preference is given to a glycidyl methacrylate; and
iii) 0% to 25% by weight, based on the total weight of components i to iii, of a styrene or $C_1$-$C_7$ alkyl (meth) acrylate; particular preference is given to styrene or n-butyl acrylate.
C. Copolymers obtainable by free-radical polymerization of
i) 10% to 80% by weight, based on the total weight of components i to iii, of at least one $C_8$-$C_{30}$ alkyl (meth)acrylate, $C_8$-$C_{30}$ vinyl ester or $C_8$-$C_{30}$ vinyl ether; particular preference is given to a $C_{10}$-$C_{20}$ alkyl (meth)acrylate;
ii) 10% to 60% by weight, based on the total weight of components i to iii, of a reactive monomer selected from the group consisting of glycidyl acrylate, glycidyl methacrylate, and MAAn; particular preference is given to a glycidyl methacrylate; and
iii) 0% to 25% by weight, based on the total weight of components i to iii, of a styrene or $C_1$-$C_7$ alkyl (meth)acrylate; particular preference is given to styrene or n-butyl acrylate.

DETAILED DESCRIPTION OF THE PREFERRED EMBODIMENTS

The copolymers of the invention can be prepared in analogy to the processes described in EP 1316597 and EP 655465.

The monomers i) of the invention may be $C_8$-$C_{30}$ alkyl (meth)acrylates, $C_8$-$C_{30}$ vinyl esters, $C_8$-$C_{30}$ vinyl ethers, $C_8$-$C_{30}$ olefins or glycerides (i.e., glycerol esters) of unsaturated $C_8$-$C_{30}$ carboxylic acids. Preference is given to $C_{10}$-$C_{20}$ vinyl esters, $C_{10}$-$C_{20}$ vinyl ethers, and, with particular preference, $C_{10}$-$C_{20}$ alkyl (meth)acrylates.

By $C_8$-$C_{30}$ alkyl (meth)acrylates, $C_8$-$C_{30}$ vinyl esters, $C_8$-$C_{30}$ vinyl ethers, $C_8$-$C_{30}$ olefins or glycerides (i.e., glycerol esters) of unsaturated $C_8$-$C_{30}$ carboxylic acids are meant in particular the following: (meth)acrylic esters of long-chain acids, such as lauryl acrylate, hexadecyl acrylate, stearyl acrylate, behenyl acrylate; vinyl esters and vinyl ethers such as vinyl laurate, vinyl hexadecanoate, vinyl stearate, and vinyl behenate; lauryl vinyl ether, hexadecyl vinyl ether, stearyl vinyl ether, and behenyl vinyl ether. The glycerides are the glycerol esters of unsaturated carboxylic acids, such as linoleic and linolenic acid, oleic acid, ricinoleic acid, icosenoic acid, eicosapentaenoic acid, preferably polyunsaturated fatty acids. Particularly preferred monomers are (meth)acrylates such as lauryl acrylate, hexadecyl acrylate, stearyl acrylate, and behenyl acrylate.

Component i) (e.g., lauryl acrylate) is used in general at 10% to 90%, preferably 20% -80%, more preferably 30%-60%, by weight—based on the total weight of components i to iv.

The reactive monomers ii) are generally double-bond-containing monomers having at least one epoxide, isocyanate, carbodiimide, silane, β-dicarbonyl, oxazoline or anhydride group. They are more particularly glycidyl acrylate, glycidyl methacrylate, MMAn, allyl glycidyl ether, glycidyl ethacrylate, acryloyl isocyanate, dimethyl-meta-isopropenyl-benzyl isocyanate, and itaconic anhydride, diacetoneacrylamide, vinyltrialkoxysilane, methacryloyloxypropyltrimethoxysilane, vinyloxazoline, and isopropenyloxazoline. Preferred monomers are glycidyl acrylate, glycidyl methacrylate, MMAn, allyl glycidyl ether, glycidyl ethacrylate, dimethyl-meta-isopropenyl-benzyl isocyanate, and itaconic anhydride. Particular preference is given to glycidyl acrylate, glycidyl methacrylate, and MMAn.

The monomers ii) are used in general at 0.5%-70%, preferably 10% to 65%, more preferably 20%-60%, by weight—based on the total weight of components i to iv.

The monomers iii) may be vinylaromatics, $C_1$-$C_7$ alkyl (meth)acrylates, ethylenically unsaturated acetophenone derivatives or benzophenone derivatives, $C_1$-$C_7$ vinyl esters, $C_1$-$C_7$ vinyl ethers, ethylenically unsaturated nitriles, ethylenically unsaturated amides, vinyl halides, $C_2$-$C_7$ olefins, cyclic lactams or mixtures of these monomers.

Suitable vinylaromatic compounds include vinyltoluene, α- and p-methylstyrene, α-butylstyrene, 4-n-butylstyrene, 4-n-decylstyrene, and, preferably, styrene.

Examples of $C_1$-$C_7$ alkyl (meth)acrylates include methyl methacrylate, methyl acrylate, n-butyl acrylate, and ethyl acrylate. Also suitable in particular are mixtures of the (meth) acrylic acid alkyl esters. By $C_1$-$C_7$ alkyl (meth)acrylates are meant, additionally, hydroxyl-comprising monomers such as, in particular, $C_1$-$C_7$ hydroxyalkyl (meth)acrylates, and ureido-comprising monomers, such as $C_1$-$C_7$ ureido (meth)acrylates.

By ethylenically unsaturated acetophenone or benzophenone derivatives are meant the photoinitiators described in EP-A-346 734, EP-A-377199, DE-A-4 037 079, and DE-A-3 844 444. The ethylenically unsaturated group is preferably an acrylic or methacrylic group.

Examples of vinyl esters of carboxylic acids having 1 to 7 C atoms are vinyl acetate, vinyl propionate, and vinyl butyrate.

Examples of suitable vinyl ethers include vinyl methyl ether or vinyl isobutyl ether.

Examples of ethylenically unsaturated nitriles are acrylonitrile and methacrylonitrile, and of ethylenically unsaturated amides are acrylamide or (meth)acrylamide.

The vinyl halides are ethylenically unsaturated compounds substituted by chlorine, fluorine or bromine, preferably vinyl chloride and vinylidene chloride.

By $C_2$-$C_7$ olefins are meant hydrocarbons having 2 to 7 C atoms and one or two olefinic double bonds, such as, for example, butadiene, isoprene and chloroprene, ethylene or propylene.

Suitable cyclic lactams include, for example, N-vinylpyrrolidone or N-vinylcaprolactam.

Monomers iv) carry carboxylic acid, sulfonic acid or phosphonic acid groups or salts thereof. Examples include acrylic acid, methacrylic acid, itaconic acid, maleic acid or fumaric acid, vinylphosphonic acid, and 2-acrylamido-2-methylpropanesulfonic acid. Acrylic acid is preferred.

The preparation of the copolymers by free-radical solution polymerization and subsequent distillation is described in EP 655465. The molar masses (determined by GPC in THF with polystyrene as standard) are generally Mn 1000-100 000 or Mw 2000-200 000, particular preference being given to molecular weights of Mn 1000-10 000 and Mw 2000-20 000.

Preferably the molar mass and the amount of monomer H) are selected such that there is on average at least one group per chain that is capable of reaction with the co-components of the polymer mixture; very preferably there are two or more such groups.

On incorporation into the polymer mixture it can be advantageous if the copolymer at 23° has a zero-shear viscosity of <100 Pas.

The copolymer may be employed in solution, in the form of a dispersion or emulsion, in the form of a solid or liquid, more preferably in the form of a low-viscosity melt.

The copolymers of the invention can be utilized to produce paper, paperboard, and cardboard. They are especially suitable for assisting in paper sizing, as described in WO 2004 037867. Combinations of the polymers of the invention with starch contribute to improved sizing. With the accompanying use of the monomers iv, they may also be dispersible in water or may be added as 100% systems to the starch.

They can also be used for improving the wet strength of paper.

Adhesives for film lamination (technical lamination, composite-film and high-gloss-film lamination) are required to adhere well to nonpolar surfaces. In these applications, described in WO2004058834, the polymers of the invention are apt to promote the flow of the adhesives onto the surfaces of polymeric films. Especially so in the context of the use of polyethylene or polypropylene films.

Polymers of the invention with fractions of monomers iv) can be dispersed in water and hence also used in aqueous adhesives.

The copolymers are also suitable for imparting water repellancy to textile fibers. They can be applied in 100% form, in solvents or water (EP-A 1751345). In the dressing of leather they can be used as water repellants (WO199804748).

As primers on wood they prevent migration of low molecular mass constituents of the wood to the surface and, conversely, the sinking of coating materials into the wood. They can be used to improve the compatibility of binders and polysaccharides in fiber binding, as described in EP-A 911361.

The copolymers of the invention can be incorporated, for example, in an extruder as an addition to polymer mixtures. The copolymers of the invention are especially suitable as chain extenders, compatibilizers and/or hydrolysis stabilizers in polymers—especially biodegradable polymers and polymer mixtures. The copolymers counteract the thermal degradation of the polymers. By polymers are mean, more particularly, condensation polymers such as, for example, polyesters, polyamides, polycarbonates, polyurethanes, and polysulfones.

In particular the copolymers of the invention are suitable, as mentioned at the outset, as an addition to polymers containing starch. Polymers containing starch can be prepared by extruding polyester, starch (nonthermoplasticized or thermoplasticized), copolymer, and, optionally, plasticizers, such as glycerol or sorbitol, for example, which are used to plasticize the starch. Starch, unplasticized and, in particular, plasticized, is an advantageous filler in biodegradable polymers such as polylactic acid, polyhydroxyalkanoate, polycarbonate, polycaprolactone, and biodegradable aliphatic and aliphatic/aromatic polyesters. Starch is generally corn starch or potato starch.

An example of a suitable biodegradable polyester is polylactic acid. Polylactic acid having the following properties profile is employed with preference:

a melt volume rate (MVR at 190° C. and 2.16 kg in accordance with ISO 1133) of 0.5—preferably 2—to 30 and in particular up to 9 ml/10 minutes
a melting point below 240° C.;
a glass transition point (Tg) greater than 55° C.
a water content of less than 1000 ppm
a residual monomer (L-lactide) content of less than 0.3%
a molecular weight of more than 80 000 daltons.

Examples of preferred polylactic acids are NatureWorks® 020 or 4042D (polylactic acid from NatureWorks).

By polyhydroxyalkanoates are meant primarily poly-4-hydroxybutyrates and poly-3-hydroxybutyrates, the term further embracing copolyesters of the aforementioned hydroxybutyrates with 3-hydroxyvalerates. Poly-4-hydroxybutyrates are known in particular from Metabolix. They are sold under the trade name Mirel®. Poly-3-hydroxybutyrates are sold, for example, by PHB Industrial under the brand name Biocycle®, and by Tianan under the name Enmat®.

The polyhydroxyalkanoates generally have a molecular weight $M_w$ of 100 000 to 1 000 000 and preferably of 300 000 to 600 000.

By partially aromatic polyesters based on aliphatic diols and aliphatic/aromatic dicarboxylic acids are also meant polyester derivatives such as polyether esters, polyester amides or polyether ester amides. The suitable partially aromatic polyesters include linear, polyesters which have not undergone chain extension (WO 92/09654). Preference is given to chain-extended and/or branched partially aromatic polyesters. The latter are known from the specifications WO 96/15173 to 15176, 21689 to 21692, 25446, 25448 or WO 98/12242, all mentioned earlier, which are hereby incorporated by reference. Mixtures of different partially aromatic polyesters are also contemplated. Interesting recent developments are based on renewable raw materials (see WO-A 2006/097353, WO-A 2006/097354, and EP 08165372.7). By partially aromatic polyesters are meant, in particular, products such as Ecoflex® (BASF SE), Eastar® Bio and Origo-Bi® (Novamont).

Polyesters based on aliphatic diols and aliphatic dicarboxylic acids such as polybutylene succinate (PBS), polybutylene succinate-adipate (PBSA), polybutylene succinate-sebacate (PBSSe) are sold, for example, by Showa Highpolymers under the name Bionolle®. For recent developments see EP 08165370.1, for example.

Polycaprolactone is marketed by Daicel under the product name Placcel®.

Aliphatic polycarbonates are, in particular, polyethylene carbonate and polypropylene carbonate.

Measurement Methods

The K value according to Fikentscher was determined in THF at 21° C. on a 1% strength solution.

The molecular weight was measured by means of GPC against polystyrene standards in THF containing 0.1% trifluoroacetic acid.

EXAMPLE 1

A polymerization apparatus consisting of glass reactor, reflux condenser, stirrer, and nitrogen inlet was charged under a gentle stream of nitrogen with 791 g of o-xylene and this initial charge was heated to 140° C. 50 g of a monomer mixture consisting of 40% 2-ethylhexyl acrylate, 40% lauryl acrylate, and 20% glycidyl methacrylate were added. When 140° C. were reattained, 20 g of an initiator solution of 20 g of tert-butyl peroctoate and 180 g of o-xylene were added and polymerization was commenced for 10 min, then 950 g of monomer mixture were run in over 3 h, and 180 g of initiator solution over 3 h. Subsequently a solution of 1 g of tert-butyl peroctoate in 50 g of o-xylene was added over 5 min and full polymerization was carried out for 45 min. The solvent was then removed under reduced pressure, followed by degassing for a further 1 h at 140° C. and <100 mbar.

Solids content: 98.8% K value (1% in THF):11.4

Molecular weight: Mn 3000; Mw 5400

EXAMPLE 2

A polymerization apparatus consisting of glass reactor, reflux condenser, stirrer, and nitrogen inlet was charged under a gentle stream of nitrogen with 596 g of o-xylene and this initial charge was heated to 140° C. 37.7 g of a monomer mixture consisting of 10% 2-ethylhexyl acrylate, 70% lauryl acrylate, and 20% glycidyl methacrylate were added. When 140° C. were reattained, 15 g of an initiator solution of 15 g of tert-butyl peroctoate and 135.7 g of o-xylene were added and polymerization was commenced for 10 min, then 716 g of monomer mixture were run in over 3 h, and 135.7 g of initiator solution over 3 h. Subsequently a solution of 0.75 g of tert-butyl peroctoate in 37.7 g of o-xylene was added over 5 min and full polymerization was carried out for 45 min. The solvent was then removed under reduced pressure, followed by degassing for a further 1 h at 140° C. and <100 mbar.

Solids content: 98.2% K value (1% in THF):12

Molecular weight: Mn 3000; Mw 5700

EXAMPLE 3

A polymerization apparatus consisting of glass reactor, reflux condenser, stirrer, and nitrogen inlet was charged under a gentle stream of nitrogen with 716 g of o-xylene and this initial charge was heated to 140° C. 53.7 g of a monomer mixture consisting of 730 g of lauryl acrylate, 200 g of glycidyl methacrylate, and 70 g of maleic anhydride in solution in 75 g of o-xylene were added. When 140° C. were reattained, 20 g of an initiator solution of 20 g of tert-butyl peroctoate and 200 g of o-xylene were added and polymerization was commenced for 10 min, then 1021 g of monomer mixture were run in over 3 h, and 180 g of initiator solution over 3 h. Subsequently a solution of 1 g of tert-butyl peroctoate in 50 g of o-xylene was added over 5 min and full polymerization was carried out for 45 min. The solvent was then removed under reduced pressure, followed by degassing for a further 1 h at 140° C. and <100 mbar.

Solids content: 98.0% K value (1% in THF):12.9
Molecular weight: Mn 3000; Mw 6800

EXAMPLE 4

A polymerization apparatus consisting of glass reactor, reflux condenser, stirrer, and nitrogen inlet was charged under a gentle stream of nitrogen with 791 of o-xylene and this initial charge was heated to 140° C. 50 g of a monomer mixture consisting of 50% lauryl acrylate, and 50% glycidyl methacrylate were added. When 140° C. were reattained, 20 g of an initiator solution of 20 g of tert-butyl peroctoate and 180 g of o-xylene were added and polymerization was commenced for 10 min, then 950 g of monomer mixture were run in over 3 h, and 180 g of initiator solution over 3 h. Subsequently a solution of 1 g of tert-butyl peroctoate in 50 g of o-xylene was added over 5 min and full polymerization was carried out for 45 min. The solvent was then removed under reduced pressure, followed by degassing for a further 1 h at 140° C. and <100 mbar.

Solids content: 98.1% K value (1% in THF):13.9

EXAMPLE 5

A polymerization apparatus consisting of glass reactor, reflux condenser, stirrer, and nitrogen inlet was charged under a gentle stream of nitrogen with 791 g of o-xylene and this initial charge was heated to 140° C. 50 g of a monomer mixture consisting of 40% 2-ethylhexyl acrylate, 30% lauryl acrylate, 20% glycidyl methacrylate, and 10% soybean oil were added. When 140° C. were reattained, 20 g of an initiator solution of 20 g of tert-butyl peroctoate and 180 g of o-xylene were added and polymerization was commenced for 10 min, then 950 g of monomer mixture were run in over 3 h, and 180 g of initiator solution over 3 h. Subsequently a solution of 1 g of tert-butyl peroctoate in 50 g of o-xylene was added over 5 min and full polymerization was carried out for 45 min. The solvent was then removed under reduced pressure, followed by degassing for a further 1 h at 140° C. and <100 mbar.

USE EXAMPLES

Preparation of Starch-Containing Polymer Mixtures

In a twin-screw extruder (ZSK25) the proportions indicated in table 1 of polyester (Ecoflex FBX 7011), inventive copolymer, starch (Perfectamyl D6), glycerol, and water were blended at 180° C. and the blend was pelletized in a waterbath. The screw speed was 250 rpm and the throughput was 5 kg/h. The pellets were processed by compression molding at 160° C. to form films having a thickness of 200 μm.

Mechanical Tests

Test specimens (tensile rods) were punched from the films, and mechanical testing was carried out in accordance with ISO 527-3.

TABLE 1

Mechanical properties of the inventive polymer mixtures B1 to B10 and of the comparative mixtures C1 and C2

|  | E 1 | E 2 | E 4 | E 5 | E 6 | E 7 | E 8 | E 9 | E 10 | E 11 | E 12 | C1 | C2 |
|---|---|---|---|---|---|---|---|---|---|---|---|---|---|
| Starch (Perfectamyl D6) [% by wt] | 33 | 33 | 33 | 33 | 33 | 33 | 33 | 33 | 33 | 33 | 33 | 33 | 33 |
| Ecoflex FBX 7011 [% by wt] | 55 | 55 | 55 | 55 | 55 | 55 | 55 | 55 | 41 | 41 | 41 | 55 | 55 |
| PLA (Naturework 4042) [% by wt] |  |  |  |  |  |  |  |  | 14 | 14 | 14 |  |  |
| Glycerol [% by wt] | 6 | 6 | 6 | 6 | 6 | 6 | 6 | 6 | 6 | 6 | 6 | 6 | 6 |
| Water [% by wt] | 6 | 6 | 6 | 6 | 6 | 6 | 6 | 6 | 6 | 6 | 6 | 6 | 6 |
| Ex. 1 [% by wt*] | 0.5 | 0.2 |  |  |  |  |  |  | 0.5 |  |  |  |  |
| Ex. 2 [% by wt*] |  |  | 0.2 | 0.5 |  |  |  |  |  | 0.5 |  |  |  |
| Ex. 4 [% by wt*] |  |  |  |  | 0.2 | 0.5 |  |  |  |  | 0.5 |  |  |
| Ex. 5 [% by wt*] |  |  |  |  |  |  | 0.2 | 0.5 |  |  |  |  |  |
| Joncryl ADR 4368 |  |  |  |  |  |  |  |  |  |  |  |  | 0.5 |
| Tensile strength (MPa) | 35 | 27 | 25 | 30 | 28 | 38 | 26 | 32 | 34 | 33 | 39 | 26 | 22 |
| Breaking extension (%) | 750 | 690 | 660 | 690 | 700 | 790 | 680 | 755 | 760 | 743 | 733 | 674 | 515 |
| E-Modulus (MPa) | 110 | 112 | 107 | 109 | 115 | 119 | 110 | 115 | 250 | 243 | 264 | 120 | 112 |

% by wt* = % by weight based on the polymer mixture

The results shown in table 1 show impressively that the polymer mixtures of the invention have a significantly higher tensile strength and breaking extension than the comparative mixture C1, with 0.5% by weight, based on the polymer mixture, of the known Joncryl® ADR 4368, and than C2 (without addition of a copolymer).

The invention claimed is:

1. A polymer mixture comprising
    (a) 0.2 to 20% by weight of a copolymer obtainable by free-radical polymerization of
        i) 30% to 80% by weight, based on the total weight of components i to iv, of lauryl acrylate monomer;
        ii) 20% to 70% by weight, based on the total weight of components i to iv, of a reactive monomer selected from the group consisting of glycidyl acrylate, glycidyl methacrylate, allyl glycidyl ether, and glycidyl ethacrylate;
        iii) 0% to 75% by weight, based on the total weight of components i to iv, of one or more monomers selected from the group consisting of $C_1$-$C_7$-alkyl (meth)acrylate, and mixtures of these monomers; and
        iv) 0% to 10% by weight, based on the total weight of components i to iv, of a free-radically polymerizable monomer with carboxylic acid groups or salts thereof;
    (b) thermoplasticized or nonthermoplasticized starch; and,
    (c) one or more further polymers.

2. The polymer mixture according to claim 1, wherein the copolymer is obtainable by free-radical polymerization of
    i) 30% to 80% by weight, based on the total weight of components i to iii, of lauryl acrylate monomer;
    ii) 20% to 30% by weight, based on the total weight of components i to iii, of a reactive monomer selected from the group consisting of glycidyl acrylate, and glycidyl methacrylate; and iii) 0% to 25% by weight, based on the total weight of components i to iii, of a styrene or $C_1$-$C_7$-alkyl (meth) acrylate.

3. The polymer mixture according to claim 1, wherein the copolymer is obtainable by free-radical polymerization of
i) 30% to 80% by weight, based on the total weight of components i to iii, of lauryl acrylate monomer;
ii) 20% to 60% by weight, based on the total weight of components i to iii, of a reactive monomer selected from the group consisting of glycidyl acrylate, and glycidyl methacrylate; and
iii) 0% to 25% by weight, based on the total weight of components i to iii, of a styrene or $C_1$-$C_7$ alkyl (meth) acrylate.

4. The polymer mixture according to claim 1, wherein the further polymers are selected from the group consisting of polylactic acid, polyhydroxyalkanoate, polycaprolactone, and biodegradable aliphatic and aliphatic/aromatic polyester.

5. Cardboard comprising the polymer mixture of claim 1.

6. Paper comprising the polymer mixture of claim 1.

* * * * *